Figure 3:
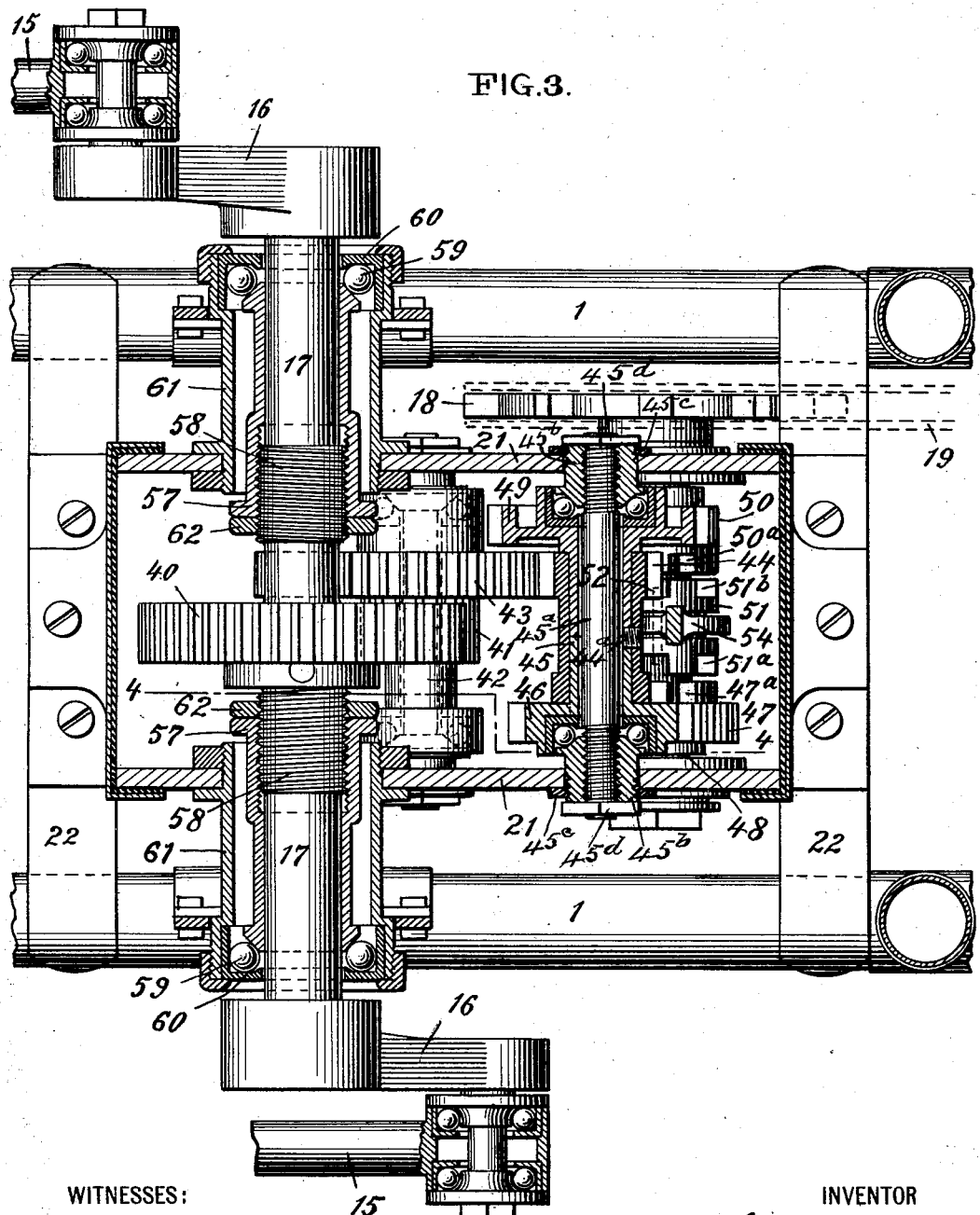

No. 701,748. Patented June 3, 1902.
G. W. MANSON.
BICYCLE DRIVING MECHANISM.
(Application filed Nov. 17, 1900.)
(No Model.) 4 Sheets—Sheet 1.
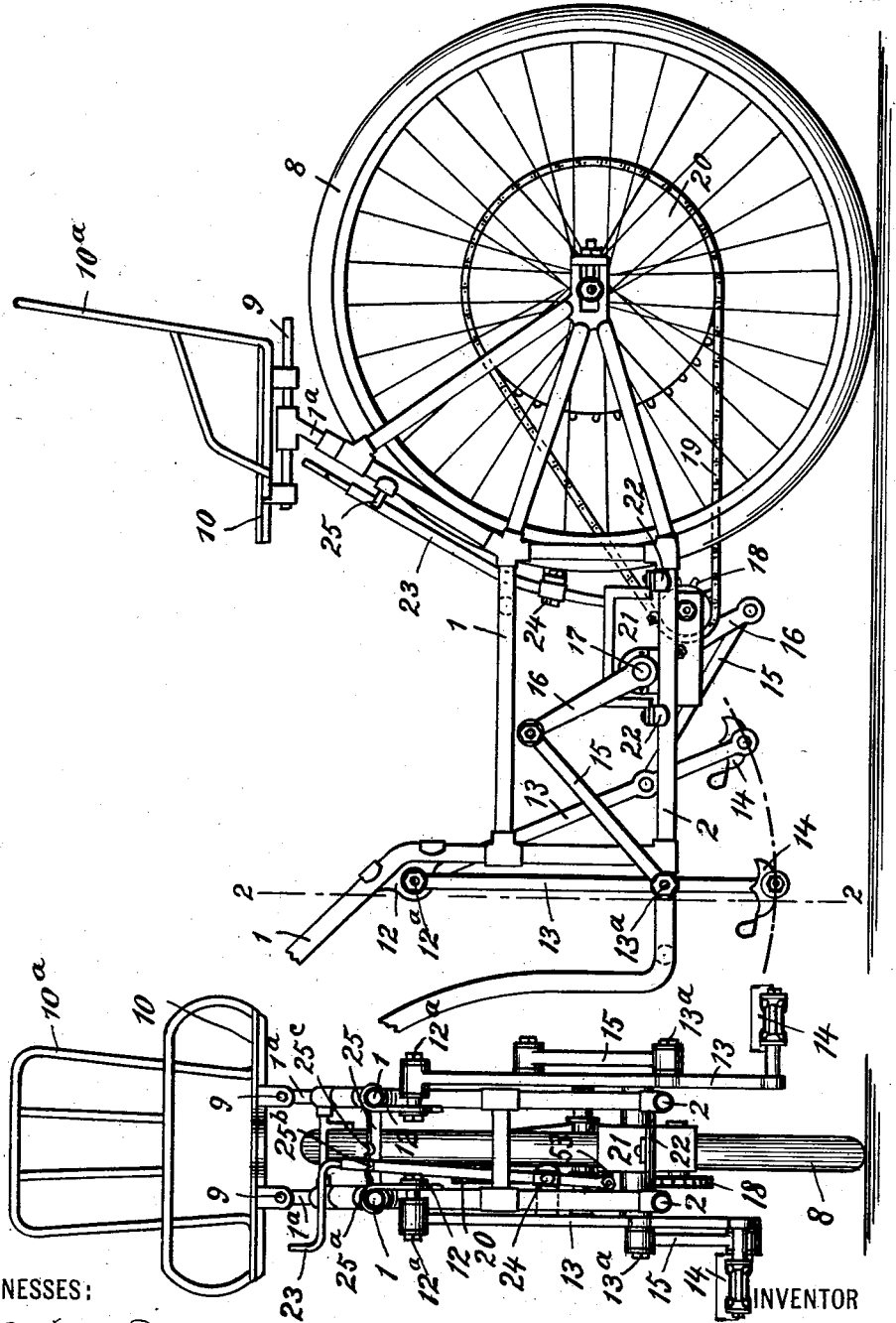
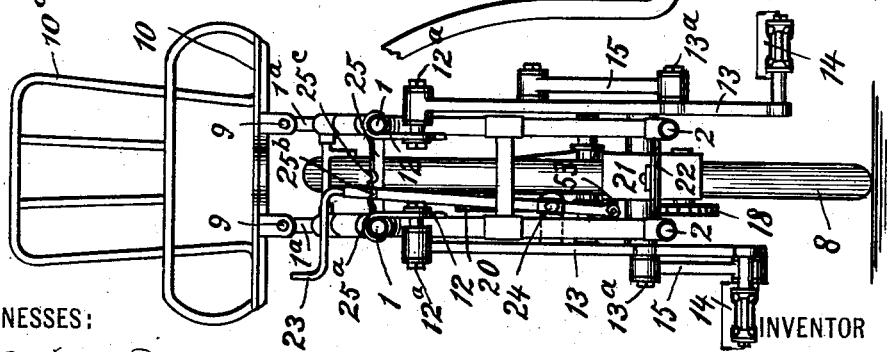
WITNESSES:
INVENTOR
Geo. W. Manson
BY
ATTORNEYS
THE NORRIS PETERS CO., PHOTO-LITHO., WASHINGTON, D. C.

No. 701,748. Patented June 3, 1902.
G. W. MANSON.
BICYCLE DRIVING MECHANISM.
(Application filed Nov. 17, 1900.)

(No Model.) 4 Sheets—Sheet 2.

WITNESSES:

INVENTOR

No. 701,748.  
Patented June 3, 1902.
G. W. MANSON.
BICYCLE DRIVING MECHANISM.
(Application filed Nov. 17, 1900.)
(No Model.)  
4 Sheets—Sheet 3.
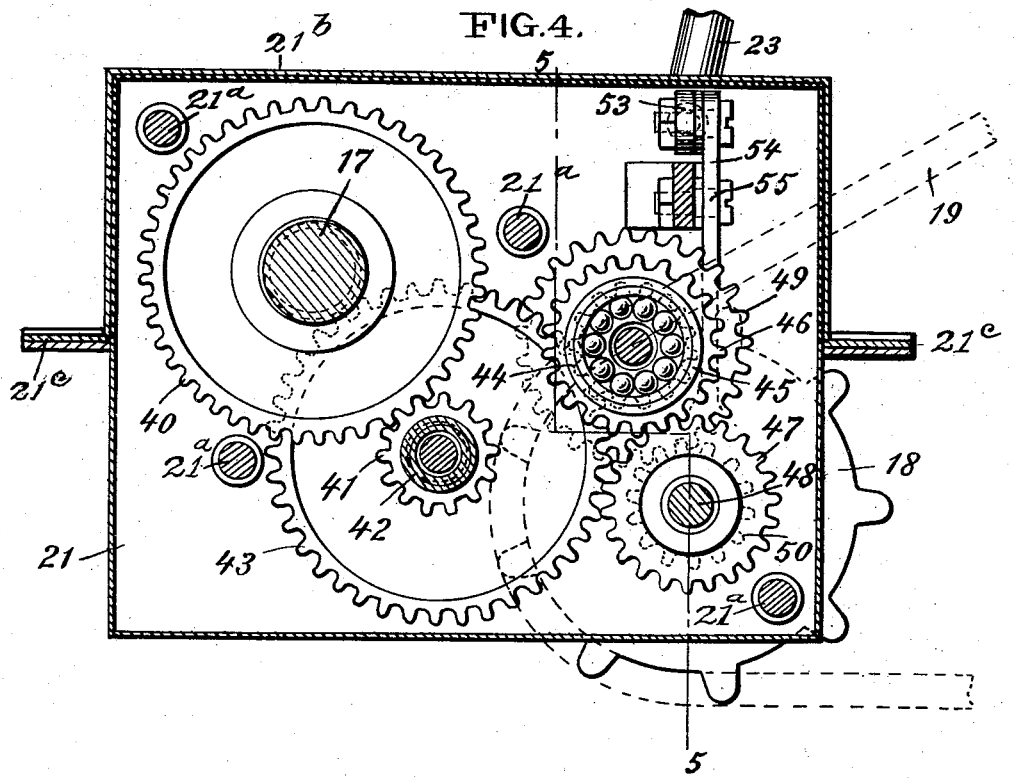
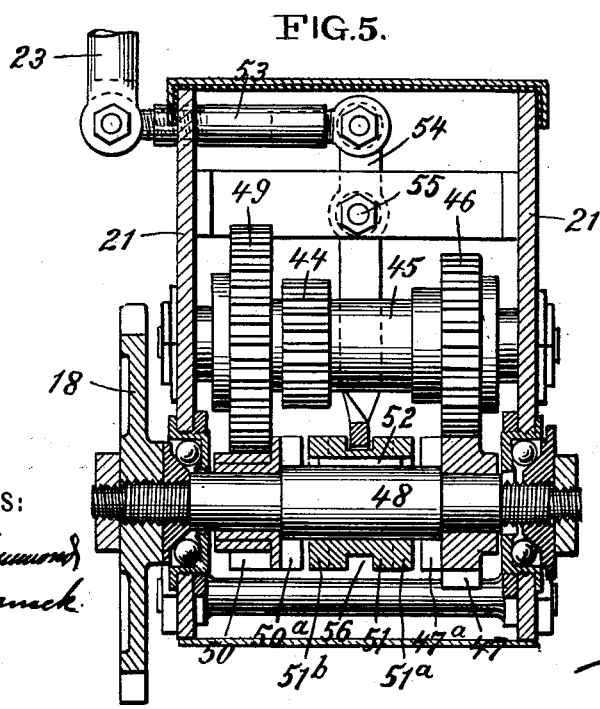
WITNESSES:
INVENTOR  
Geo. W. Manson  
BY  
Knight Bros  
ATTORNEYS

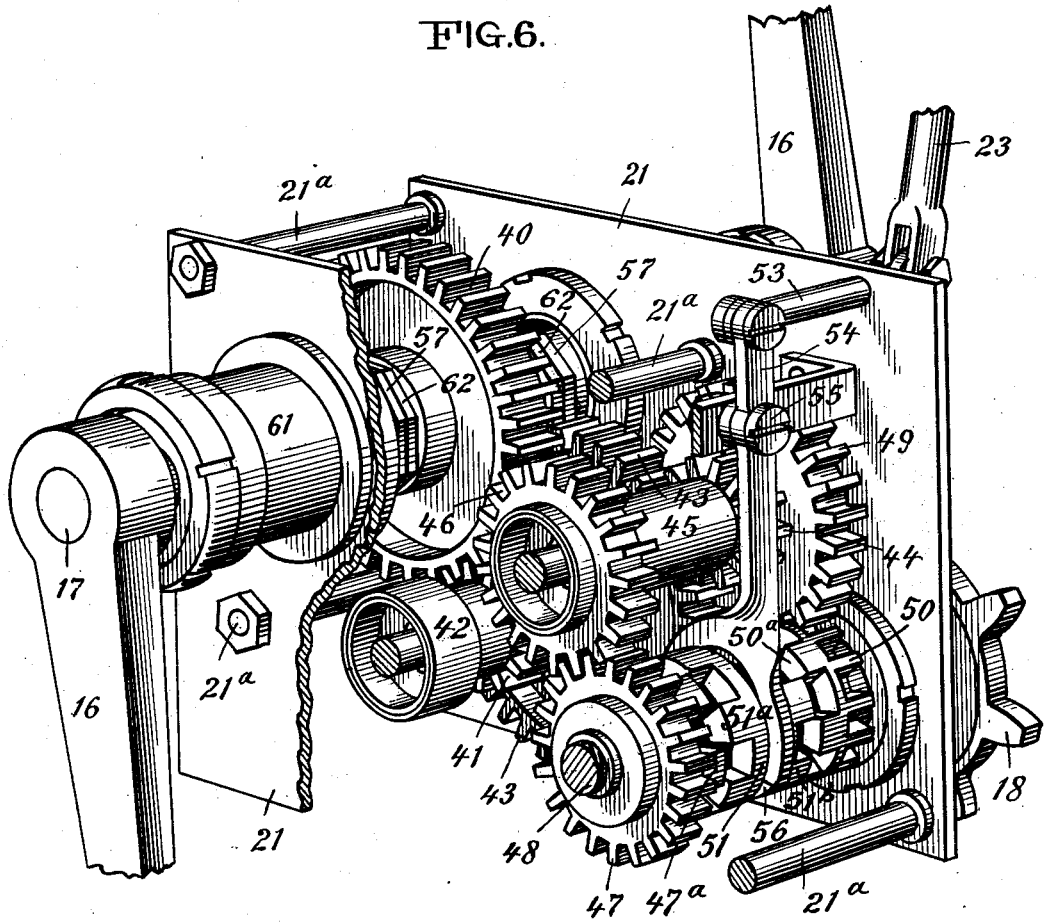

UNITED STATES PATENT OFFICE.

GEORGE W. MANSON, OF NEW YORK, N. Y.

BICYCLE DRIVING MECHANISM.

SPECIFICATION forming part of Letters Patent No. 701,748, dated June 3, 1902.

Application filed November 17, 1900. Serial No. 36,844. (No model.)

*To all whom it may concern:*

Be it known that I, GEORGE W. MANSON, a citizen of the United States, and a resident of the borough of Manhattan, in the city and State of New York, have invented certain new and useful Improvements in Bicycle Driving Mechanism, of which the following is a specification.

This invention relates to improvements in changeable driving-gear for bicycles, and is especially applicable to a bicycle constructed with a frame of the general character described and shown in Letters Patent No. 616,421, granted to me the 20th of December, 1898, and in another application of even date with the present.

In the accompanying drawings, Figure 1 is a side elevation of the central and rear parts of a bicycle embodying my present invention. Fig. 2 is a vertical section of the same on the line 2 2, Fig 1, looking toward the rear. Fig. 3 is a horizontal section of the driving-gear on a larger scale. Fig. 4 is a vertical section of the same on the line 4 4, Fig. 3. Fig. 5 is a vertical section thereof on the line 5 5, Fig. 4. Fig. 6 is a perspective view of the said gearing with part of its casing broken away.

On each side of the frame 1 2 is mounted a bracket 12, carrying a stud $12^a$, from which depends a pedal-lever 13, having a pedal 14 on its lower end. The pedal-levers 13 are so hung that they swing forward and back in paths which are mainly in the rear of a vertical line from their fulcrum-pivots $12^a$, so that the pedals have a slightly-downward movement in their forward strokes.

Studs $13^a$, secured to the pedal-levers 13 some distance above the pedals 14, afford pivot attachments for connecting-rods 15, pivoted at their rear ends to cranks 16 on the main driving-shaft 17, which is connected by gearing, presently to be described, with a small sprocket-wheel 18, connected by chain 19 with a large sprocket-wheel 20 on the shaft of the drive-wheel 8.

The gearing is mounted in a casing 21, supported by cross-bars 22 in the frame 1 2, and is particularly described as follows with reference to Figs 3, 4, 5, and 6 of the drawings: The main crank-shaft 17 carries a gear-wheel 40, meshing with a small gear-wheel 41, secured to a tubular shaft 42, carrying a larger gear-wheel 43, meshing with a small gear-wheel 44, secured to a second tubular shaft 45, carrying a large gear-wheel 46, which meshes with a similar wheel 47, which turns loose upon the shaft 48 of the sprocket-wheel 18. Another larger gear-wheel 49 is secured to the tubular shaft 45, and which meshes with a small gear-wheel 50, turning loose upon the sprocket-wheel shaft 48. The gear-wheels 47 and 50 are provided with clutch-teeth $47^a$ and $50^a$, respectively, to engage with corresponding clutch-teeth $51^a 51^b$, formed on a sliding sleeve 51, which is held from turning on sprocket-wheel shaft 48 by a tongue 52 thereon. When the teeth $51^a$ of the sliding clutch-sleeve 51 engage the clutch-teeth $47^a$ of the gear-wheel 47, the sprocket-wheel shaft 48 will be driven at moderate speed. For higher gearing the clutch-sleeve is shifted so that its teeth $51^b$ engage with the clutch-teeth $50^a$ of the gear-wheel 50, and the sprocket-wheel shaft 48 is thus driven at higher speed.

For coasting the clutch-sleeve 51 is placed in the intermediate position shown in Fig. 5, leaving both clutch-pinions 47 and 50 disconnected and the sprocket-wheel shaft 48 entirely free.

The shifting of the clutch-sleeve 51 for high and low gearing and coasting is effected by means of a hand-lever 23, fulcrumed at 24 and secured in any of the three notches $25^a$ $25^b 25^c$ in the bar 25. (Shown in Figs. 1 and 2.) This shifting-lever is connected at its lower end to a slide 53, pivoted to the upper end of a clutch-lever 54, fulcrumed at 55 in the gear-casing and engaging at its lower end in a circumferential groove 56 in the clutch-sleeve 51, so as to shift the same without interfering with its rotation.

The rearward inclination of the pedal-levers 13, as shown in Fig. 1, and the relative position of the seat 10 enable the rider to apply pressure to the pedals in both downward and forward direction with the greatest possible ease and advantage assisted by pressure against the back $10^a$.

The seat 10 is adjustable vertically by means of the telescopic seat-posts $1^a$ and longitudinally on its supporting-rails 9 to suit riders of different stature and length of limb.

In order to tighten the bearings of the crank-shaft, access is had to the inner flanged ends of the cone-bearing sleeves 57, which are internally threaded to engage threads 58 on the crank-shaft and by means of a wrench applied to their flanged ends are turned up to set the bearing-balls 59 firmly against the outer bearings 60 in the tubular casings 61, fixed in the frame. The cone-bearing sleeves 57 are then fixed in their adjusted position by means of jam-nuts 62, turned up against their inner ends.

The manner of mounting the tubular shaft 45 and the cone-bearings on which it runs is shown in Fig. 3. The hollow shaft 45 is formed of two parts, carrying the respective gear-wheels 46 49 and mounted end to end loosely on a tie-bolt 45ª and a surrounding sleeve carrying the gear-wheel 44. These three members of the hollow shaft 45 are keyed together by a screw 44ª, passing through a threaded aperture in the sleeve and into semicircular notches in the meeting ends of the inner members of the hollow shaft.

The tie-bolt 45ª is threaded at both ends for the reception of cone-nuts 45ᵇ, which are also threaded on the outside, so as to screw into the sides of the casing 21 for tightening the bearings afforded by the conical inner ends of said nuts 45ᵇ. Jam-nuts 45ᶜ fix the cone-nuts 45ᵇ in their position of adjustment in the case, and external jam-nuts 45ᵈ fix the bolt 45ª from turning in the nuts 45ᵇ.

The two sides of the casing 21 are firmly tied together by rods 21ª, Fig. 4, and the said casing is tightly closed by a cover 21ᵇ, with felt packing 21ᶜ between the joints.

The boxes 61 of the crank-shaft 17 are securely clamped at their inner ends to the sides 21 of the casing, and their projecting outer ends are supported on the lower bars 2 of the frame, as shown in Fig. 3.

In order to provide the necessary adjustment between the shifting-lever 23 and the clutch-sleeve 51, so as to insure the correct position of the clutch-sleeve in gear with the clutch-pinion 47 or 50 or in an intermediate position free from both, the connecting-rod 53 has the form of a sleeve with right and left internal threads at its respective ends taking corresponding threads on the pivot-bolts by which it is connected to the respective levers 23 and 54, as shown in Fig. 5, so that by turning the hollow connecting-rod 53 in either connection the length of the connection between the levers 23 and 54 may be accurately adjusted.

Having thus described my invention, the following is what I claim as new therein and desire to secure by Letters Patent:

The combination of a suitable cycle-frame, a pair of pendent pedal-levers 13 hung from their upper ends to the frame so that they swing forward and back in paths which are mainly in the rear of a vertical line from their fulcrum-pivots in the forward part of the frame, pedals 14 mounted on the lower ends of said levers, connecting-rods 15 pivoted to the pedal-levers at their forward ends, crank-arms 16 to which the rear ends of the connecting-rods are respectively pivoted, a crank-shaft 17 on the extremities of which the crank-arms 16 are mounted, gear-wheel 40 keyed thereon; gear-wheel 41 driven by the wheel 40; shaft 42 on which the wheel 41 is fixed; gear-wheel 43 also fixed on shaft 42; pinion 44 driven by the wheel 43; shaft 45 on which the pinion 44 is fixed; gear-wheels 46 and 49 of different diameters fixed on the shaft 45 and driven thereby; loose pinions 47 and 50 driven by the wheels 46 and 49 respectively; and having clutch-teeth on their opposed faces; sprocket-wheel shaft 48 on which the pinions 47 and 50 are loosely mounted; sprocket-wheels 18, 20 and chain 19 transmitting motion from the shaft 48 to the drive-wheel 8; sliding clutch-sleeve 51, 51ª, 51ᵇ, splined on shaft 48 so as to drive the same; and means for shifting the said clutch-sleeve into engagement with either of the pinions 47 and 50, or out of engagement with either so as to drive the sprocket-wheel shaft 48 at variable speed or permit it to run free, substantially as described.

GEORGE W. MANSON.

Witnesses:
OCTAVIUS KNIGHT,
WM. P. HAMMOND.